(12) United States Patent
Lipp

(10) Patent No.: US 7,436,856 B2
(45) Date of Patent: Oct. 14, 2008

(54) METHOD FOR TRANSMITTING VOICE DATA PACKETS

(75) Inventor: Friedrich Lipp, Hof bei Salzburg (AT)

(73) Assignee: Rohde & Schwarz GmbH & Co. KG, Munich (DE)

( * ) Notice: Subject to any disclaimer, the term of this patent is extended or adjusted under 35 U.S.C. 154(b) by 1178 days.

(21) Appl. No.: 10/203,438

(22) PCT Filed: Dec. 14, 2000

(86) PCT No.: PCT/EP00/12749

§ 371 (c)(1),
(2), (4) Date: Nov. 12, 2002

(87) PCT Pub. No.: WO01/71945

PCT Pub. Date: Sep. 27, 2001

(65) Prior Publication Data

US 2003/0091063 A1    May 15, 2003

(30) Foreign Application Priority Data

Mar. 22, 2000  (DE) ................................ 100 14 064

(51) Int. Cl.
*H04J 3/18* (2006.01)
*H04J 3/04* (2006.01)
*H04B 1/66* (2006.01)

(52) U.S. Cl. .................. 370/477; 370/533; 375/240

(58) Field of Classification Search .................. 370/229, 370/230, 912, 237, 238, 242, 283, 326, 351, 370/477, 533; 375/240
See application file for complete search history.

(56) References Cited

U.S. PATENT DOCUMENTS

| 4,726,019 A | * | 2/1988 | Adelmann et al. | .......... 370/474 |
| 5,282,207 A | * | 1/1994 | Jurkevich et al. | .......... 370/468 |
| 5,818,913 A | * | 10/1998 | O'Mahony | ............... 379/93.08 |
| 6,738,374 B1 | * | 5/2004 | Olkkonen et al. | ........... 370/389 |
| 6,822,974 B1 | * | 11/2004 | Vaidya | ....................... 370/512 |
| 7,065,374 B2 | * | 6/2006 | Lipp et al. | .................. 455/502 |

FOREIGN PATENT DOCUMENTS

| DE | 198 07 186 | | 6/1999 |
| EP | 1266465 B1 | * | 5/2004 |
| GB | 2 321 160 | | 7/1998 |
| WO | 98/59436 | | 6/1997 |

OTHER PUBLICATIONS

"Lexikon der Datenkommunikation," *Datacom Buchverlag GmbH* [CD-ROM], 1998.
Matich, G.E., et al., "The Application of Software Radio Techniques for Airborne Passenger Telephony and Future ATC Communications Systems," *GEC Marconi*, pp. 4/2-11, Nov. 25, 1997.
Ishida, H., et al., "A Multiplexing Method in Consideration of Cell Delay Variation," *Oki Kansai Laboratory*: 1501-1505, May 1, 1994.

* cited by examiner

*Primary Examiner*—Seema S. Rao
*Assistant Examiner*—Mon Cheri S Davenport
(74) *Attorney, Agent, or Firm*—Christensen O'Connor Johnson Kindness PLLC

(57) ABSTRACT

A method for transmitting digital voice data packets between voice data inputs of a plurality of channels (A B, C, D) and a transmitter comprises the following steps: compressing the voice data packets to compressed data packets in a vocoder assigned to every channel, feeding the compressed data packets of every channel to a control device, unsolicited, unsynchronized transmission of the compressed data packets on a data bus common to all channels from the control device to a processor assigned to the transmitter, combining a defined number of compressed data packets of a certain channel which have been transmitted last on the data bus to a transmission block by means of a processor, a last compressed data packet being fed to the transmission block only when the transmission of the transmission block has already started.

8 Claims, 4 Drawing Sheets

METHOD FOR TRANSMITTING VOICE DATA PACKETS

This is a United States national stage application of International application No. PCT/EP00/12749, filed Dec. 14, 2000, the benefit of the filing date of which is hereby claimed under 35 U.S.C. 120, which in turn claims the benefit of German application No. 100 14 064.5, filed Mar. 22, 2000, the benefit of the filing date of which is hereby claimed under 35 U.S.C. § 119.

The invention relates to a method for transmitting voice data packets between voice data inputs of a plurality of channels and at least one transmitter, in particular a transmitter for the VDL (VHF-Digital-Link) aeronautical radio service. Such aeronautical radio service transmitters are used for digital voice transmission and the transmission of further digital data between a ground station and mobile stations located in aircraft.

Several voice channels are processed simultaneously in this regard. Voice data packets supplied at voice data inputs are compressed respectively in a vocoder. These compressed data packets are supplied to a control unit described as an RIU and transmitted by this via a bus system to one of a plurality of transmitters operating in parallel.

The object of the present invention is to specify a method for transmitting voice data packets between voice data inputs of a plurality of channels and at least one transmitter, which method enables the voice data packets to be sent out by the transmitter with a smaller delay.

The object is achieved by the features of claim 1.

The invention is based on the knowledge that to transmit the data packets between the control unit and the transmitter, a free-running, unsynchronized transmission method is preferably used and the data packets of all channels are transmitted on a common data bus. A link processor of the transmitter combines a defined number of the compressed data packets of a certain channel that have been transmitted last on the data bus to a transmission block (burst), combining to form the transmission block already being started before the last data packet belonging to this transmission block has been transmitted and this as yet incomplete transmission block is already being sent. As soon as the last data packet transmitted via the data bus reaches the link processor of the transmitter, it is added to the transmission block while transmission of the latter is in progress, so that the transmission block can be transmitted completely.

Claims 2 to 7 relate to advantageous developments of the invention.

Combination of the compressed data packets takes place at a start pulse generated at set time intervals. The problem can arise here that the penultimate data packet is received by the link processor in a narrow tolerance range around the time of this start pulse. Since the time of receipt of this data packet is subject to certain run-time variations (jitter), situations can occur in which this penultimate data packet is received before the start pulse or only after the start pulse and thus no clear allocation is provided. According to a development of the invention, it is therefore proposed to bring forward the time of the start pulse by a constant time offset if it is established that the time of receipt of this penultimate data packet lies within this tolerance range around the time of the original start pulse.

The processor of the transmitter preferably comprises a pre-processor connected to the data bus, a main processor, a shift register and a timing unit. The timing unit transmits a start pulse to the main processor at constant time intervals, whereupon the main processor takes over the last n−1 compressed data packets received by the pre-processor via the data bus, combines them to a transmission partial block consisting of n−1 compressed data packets and files this in the shift register. Thus this partial transmission block can already be sent. As soon as the pre-processor has received the last, i.e. n-th, data packet from the data bus, this sends a corresponding control command (interrupt) to the main processor, at which the main processor takes the last data packet still missing from the pre-processor and the complete transmission block is made available in the shift register. The data of the shift register can be transmitted via a further data bus to a digital signal processor (DSP) of the transmitter, which processor supplies the data to the modulator, for example an I/Q modulator, of the transmitter.

A practical example of the invention is described in greater detail below with reference to the drawing. In the drawing.

Figure 1:
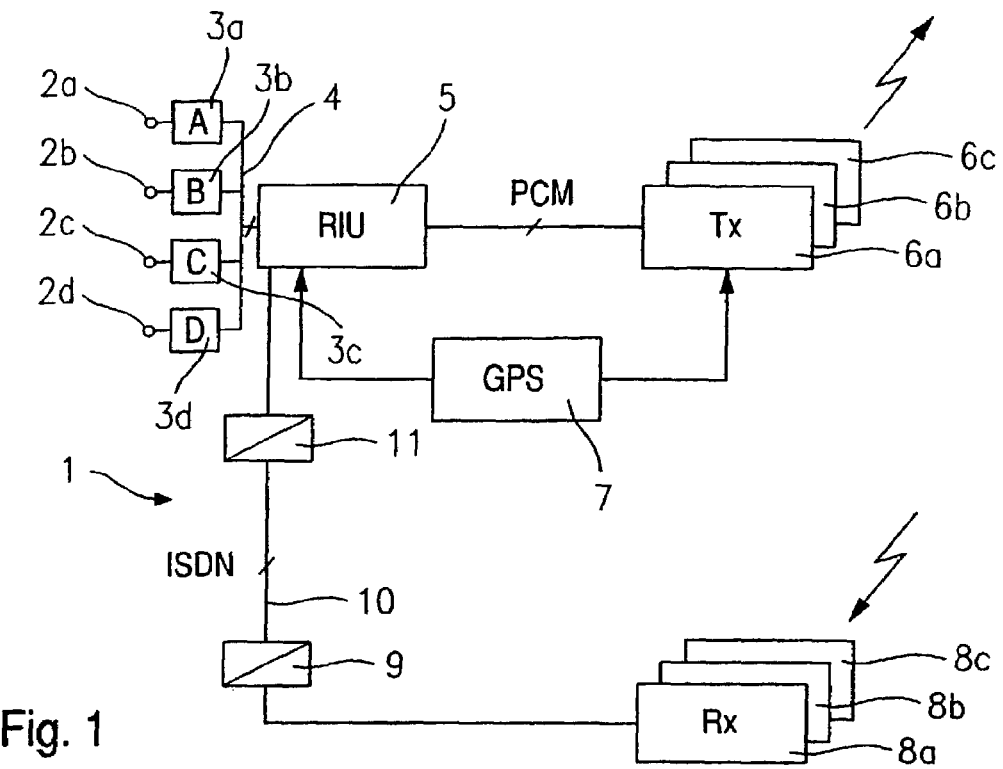
FIG. 1 shows a block diagram of a transmitting-receiving device for VDL aeronautical radio.

FIG. 1 shows a schematic block diagram of a transmitting and receiving device 1, which can be used in particular for VDL (VHF-Digital-Link) aeronautical radio. The individual operators, for example air traffic controllers, are connected to the voice data inputs and voice data outputs 2a, 2b, 2c, 2d for example via microphones and headphones (not shown), amplifiers and analog-to-digital converters (not shown), so that the voice data inputs 2a to 2d receive digital voice packets. In the practical example shown, a total of four voice data inputs 2a to 2d are available, which are assigned to four channels A, B, C and D. Each channel A, B, C, D has a vocoder 3a, 3b, 3c and 3d respectively. In the vocoders 3a to 3d, the voice data are compressed and redundant data eliminated and a vocoder-specific error correction code added respectively. The compressed data packets are supplied via a data bus 4 to a central control unit 5, which is described generally as RIU (Radio Interface Unit). The control unit RIU 5 is connected via a PCM (Pulse Code Modulation) data bus to a plurality of transmitters Tx 6a, 6b, 6c, which emit configured transmission blocks (bursts) at set times in a certain manner. A time normal receiver 7, for example a receiver for the GPS system, is connected both to the control unit RIU 5 and to the transmitters 6a to 6c.

A plurality of receivers Rx 8a, 8b, 8c are located for frequency-wise decoupling at some distance from the transmitters 6a to 6c and are connected via a data converter 9 to a data line 10, which is in turn connected via a data converter 11 to the control unit RIU 5. The data line 10 can be a plurality of ISDN telephone lines, for example.

Figure 2:
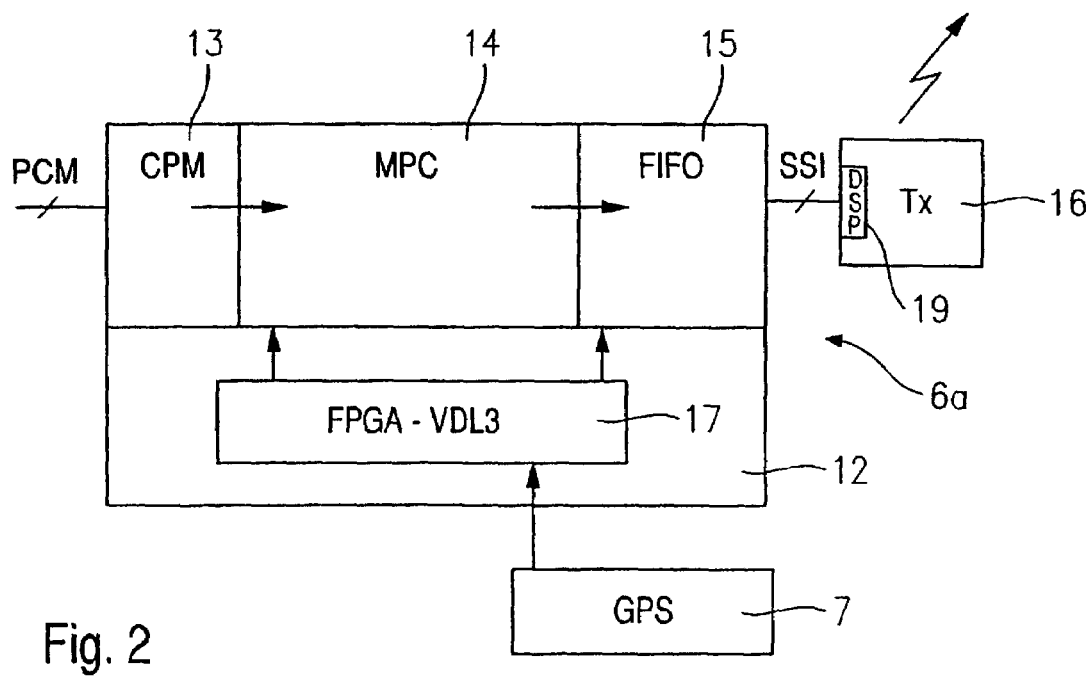
FIG. 2 shows a detailed block diagram of the transmitter.

FIG. 2 shows a more detailed block diagram of a transmitter 6a. The transmitter 6a comprises a link processor 12, which comprises a pre-processor 13 connected to the PCM data bus, a main processor 14 and a shift register 15. The pre-processor 13 is formed as a risk processor and is also designated CPM (Communication Processor Module). The main processor is also termed MPC (main PC) and is connected to the shift register 15 formed as FIFO (first in-first out). The shift register 15 is connected via a further data bus, described as the SSI data bus, to the digital signal processor (DSP) 17 of the actual transmitter 16.

A timing unit 17 is connected to the time normal receiver 7. The timing unit assembly 17 is also described as FPGA-VDL3. The timing unit 17 transmits a start pulse to the main processor 14 at constant time intervals. The start pulse is linked fixedly to the TDMA frame and is time-rated depending on the processing duration of the transmission packet editing. The start pulses are generated for the four channels A, B, C and D in the practical example at different times. Following receipt of a start pulse for the assigned channel, the main processor 14 takes over from the pre-processor 13 n-1 data packets last received via the PCM data bus. If a transmission block(burst) consists for example of six compressed data blocks in all for a defined channel, the main processor 14 initially takes only five such data packets from the pre-processor 13. Immediately after taking over these five data packets, the main processor commences so-called scrambling, i.e. combining the data packets in the transmission block and coding to modulation data, and adds the voice symbols to the voice burst header already formed previously. The transmission partial block(partial burst) produced in this case is filed in the shift register 15 and can be transmitted even now via the SSI data bus to the digital signal processor 19 of the transmitter 16 and be sent. The timing unit 17 transmits further start pulses to the shift register 15 to determine the time at which the data are transmitted by the shift register 15 via the SSI data bus to the transmitter 16. As soon as the pre-processor has received the still missing sixth (generally n-th) data packet via the PCM data bus, it transmits a corresponding control command (interrupt) to the main processor 14, so that the main processor 14 takes the still missing last data packet from the pre-processor 13, performs scrambling and the necessary coding and adds the scrambled data packet to the transmission partial block already generated, so that a complete transmission block (burst) is created.

A timing unit 17 is connected to the time normal receiver 7. The timing unit assembly 17 is also described as FPGA-VDL3. The timing unit 17 transmits a start pulse to the main processor 14 at constant time intervals. The start pulse is linked fixedly to the TDMA frame and is time-rated depending on the processing duration of the transmission packet editing. The start pulses are generated for the four channels A, B, C and D in the practical example at different times. Following receipt of a start pulse for the assigned channel, the main processor 14 takes over from the pre-processor 13 n–1 data packets last received via the PCM data bus. If a transmission block (burst) consists for example of six compressed data blocks in all for a defined channel, the main processor 14 initially takes only five such data packets from the pre-processor 13. Immediately after taking over these five data packets, the main processor commences so-called scrambling, i.e. combining the data packets in the transmission block and coding to modulation data, and adds the voice symbols to the voice burst header already formed previously. The transmission partial block (partial burst) produced in this case is filed in the shift register 15 and can be transmitted even now via the SSI data bus to the digital signal processor 17 of the transmitter 16 and be sent. The timing unit 17 transmits further start pulses to the shift register 15 to determine the time at which the data are transmitted by the shift register 15 via the SSI data bus to the transmitter 16. As soon as the pre-processor has received the still missing sixth (generally nth) data packet via the PCM data bus, it transmits a corresponding control command (interrupt) to the main processor 14, so that the main processor 14 takes the still missing last data packet from the pre-processor 13, performs scrambling and the necessary coding and adds the scrambled data packet to the transmission partial block already generated, so that a complete transmission block (burst) is created.

Figure 3:
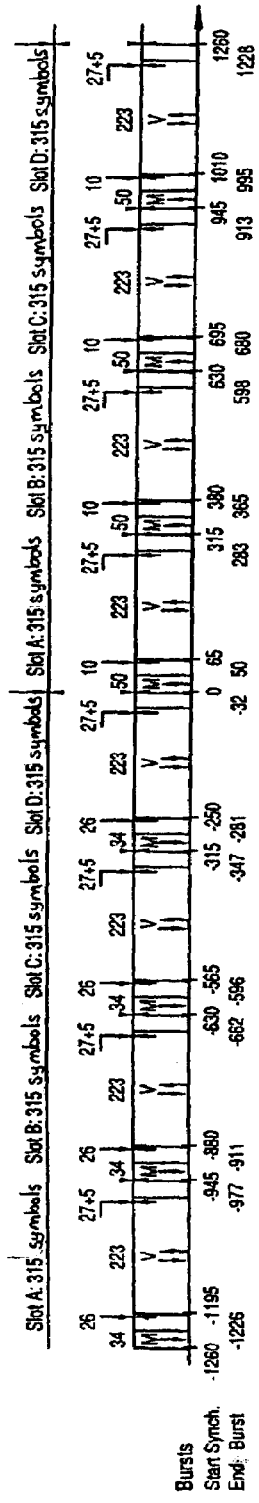
FIG. 3 shows a scheme to explain the transmission and receipt blocks (bursts)

FIG. 3 shows the transmission blocks (bursts) that are normally used in VDL aeronautical radio as a function of the time t, the time axis being scaled with the number of data symbols transmitted. Data frames (frames) of 1,260 symbols each are divided into four so-called management bursts (M) and four voice data bursts (V). The arrow indicated for each transmission block (burst) indicates the transmission direction. An arrow upwards signifies transmission from the ground station to the station in the aircraft. Conversely, an arrow pointing downwards signifies a transmission from the station in the aircraft to the ground station shown in FIG. 1. The voice data bursts V can be transmitted in both directions depending on the situation. The transmission blocks must be sent in a fixed TDMA scheme (circuit mode). The transmitters 6a, 6b, 6c ensure an optimum transfer of the vocoder packets. The control unit RIU 5 remains unencumbered by this task.

Figure 5:
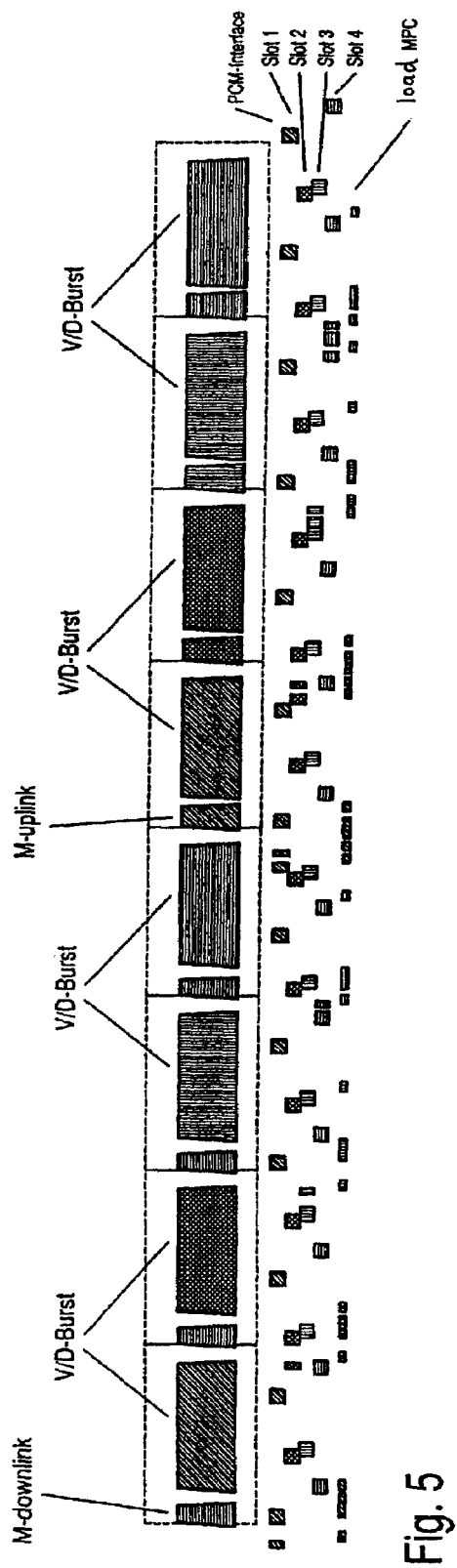
FIG. 5 shows a scheme to explain the processes on the PCM data bus in relation timewise to the transmission-receipt blocks (bursts)

FIG. 5 likewise shows a time diagram, the transmission blocks (bursts) being shown in the upper area and the data occupancy on the PCM data bus in the lower area in relation timewise to these. The data belonging to different channels A, B, C and D are hatched differently. It is recognizable that the data of different channels and different transmission bursts are transmitted in different slots of the PCM data bus. The six data packets last transmitted on the PCM data bus in each case are assigned to a V/D burst. In this case the compressed data packets of all channels are transmitted according to the invention on the PCM data bus in a free-running manner, i.e. without synchronization. Time delays, which normally occur with synchronization procedures, are thereby avoided. The scrambling of a transmission block, i.e. combining of the data packets and coding, can begin when only five of the six data packets in total have been transmitted via the PCM data bus, the still missing sixth data packet only being added when the transmission of the transmission block (burst) has already begun. This is recognizable when looking at the load of the main processor MPC (14 in FIG. 2), which is likewise indicated in FIG. 5. It is clear here that the load is given chiefly before the transmission of the burst, namely when the five data packets already present are scrambled. When the still missing sixth data packet of this channel arrives, another short load of the main processor MPC occurs immediately after this. Even if the still missing sixth data packet only arrives at the pre-processor 13 at a time at which half of the transmission block (burst) has already been sent, this still missing data packet can still be integrated into the transmission block (burst). The time delay in the transmission link as a whole is reduced considerably by this inventive measure.

Figure 4:
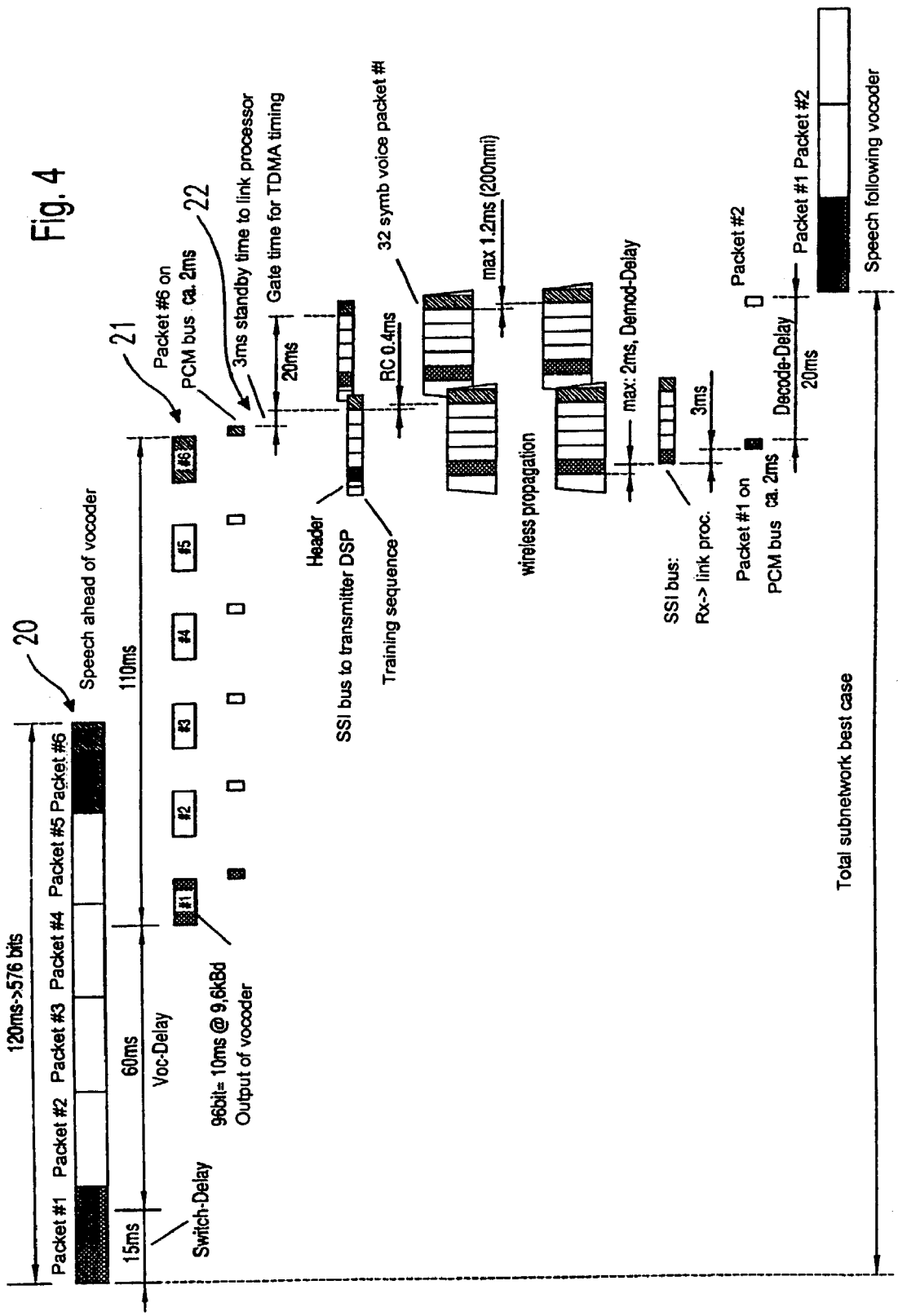
FIG. 4 shows a scheme to explain voice transmission and the composition of the voice run-time.

FIG. 4 shows the time relationships on transmission of the voice data from the voice data inputs 2a to 2d to the transmitter up to production of the transmission bursts. Conversely, the time delay on the receiver side from the receipt of a burst to reproduction of the voice data at the voice data outputs 2a to 2d is shown. The as yet uncompressed data packets 20 are present ahead of the vocoders 3a to 3d. Following a delay time resulting from the transmit-receive switchover (switch-delay) and the delay of the vocoders (voc-delay), the voice data packets are present at the output of the vocoders 3a to 3d in their compressed form 21. Following a processing delay of the control unit RIU, the compressed data packets are on the PCM data bus, as indicated by arrow 22. As soon as the first five of the total of six voice data packets belonging to a burst have been received by the pre-processor CPM 13 and the main processor MPC 14 has received the start pulse, the main processor MPC 14 starts to scramble these five data packets already present. These five data packets are identified by #1, #2, #3, #4 and #5. As soon as the sixth data packet #6 has reached the pre-processor CPM 13, this is transmitted immediately to the main processor MPC 14 and integrated into the burst while this burst is still being transmitted. Prior to transmission via the SSI data bus to the transmitter 16, the data packets are provided with a training sequence and a header by the main processor 14.

Following wireless transmission, the reverse procedure takes place on the receiving side. The bursts received are decoded and routed via an SSI data bus to the link processor of the receiver, which routes the compressed data packets via a PCM data bus and the data line 10 to the control unit RIU, which distributes these according to the channels A, B, C, D to the individual vocoders 3a to 3d. The data packets are decompressed again in the vocoders 3a to 3d.

Figure 6:
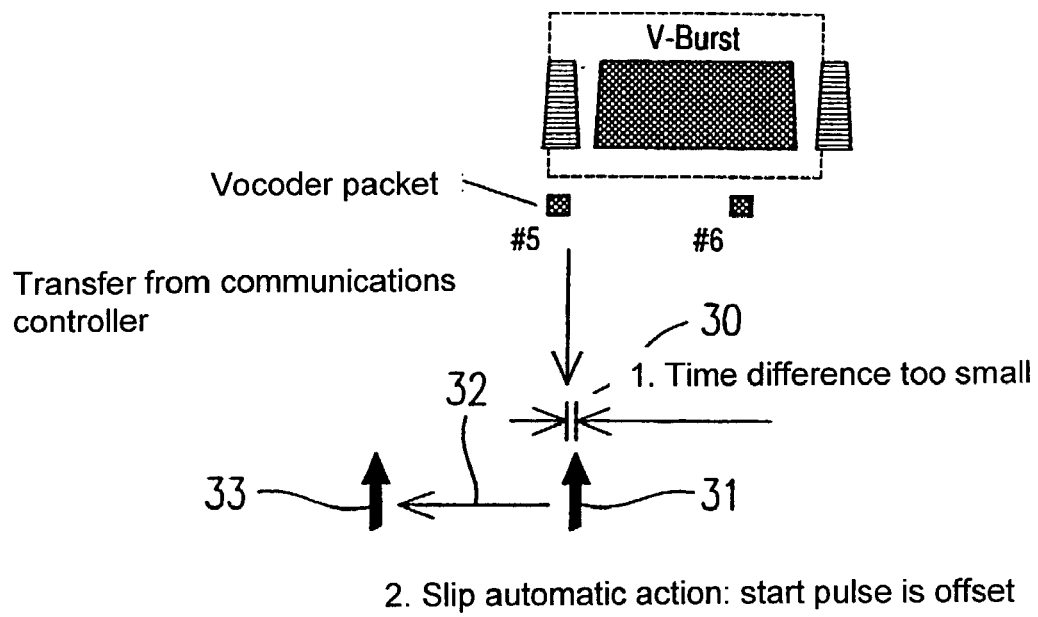
FIG. 6 shows a scheme to explain the automatic start pulse offset.

FIG. 6 shows a preferred development of the invention. In the procedure according to the invention, to begin scrambling for the first five data packets (generally n- 1 data packets) when the main processor MPC 14 receives a start pulse from the timing unit 17, the problem occurs that the assignment of the data packets to a transmission block (V-burst) can vary. As explained, a reduction in the transmission run-time can be achieved according to the invention in that the compressed data packets are transmitted on the PCM data bus in a free-running manner, i.e. without synchronization. The temporal arrangement of the compressed data packets with reference to the fixedly prescribed transmission time of the burst is therefore undefined. This is not disruptive in principle, as according to the procedure according to the invention the last five data packets are scrambled first in principle and the still missing sixth data packet is added later and no more than six data packets are transmitted between two bursts. It is therefore normally ensured that all data packets are transmitted continuously. However, problems occur if one of the compressed data packets is received in close proximity timewise to the start pulse by the link processor 12. Since transmission of the compressed data packets is subject to certain time variations (jitter), it can occur that the fifth data packet is transmitted once before the start pulse and a second time following the start pulse. The assignment of the data packets to the bursts can thus jump and the danger exists that in the event of such a jump, one data packet is not transmitted at all and another data packet is transmitted twice.

To prevent this, it is proposed according to the preferred development according to the invention in a case in which the time of receipt of the penultimate data packet, i.e. the fifth data packet, is within a predetermined tolerance range 30 around the time of the original start pulse 31 envisaged to offset the start pulse by a constant time offset 32 and thus to use an offset start pulse 33 instead of the originally envisaged start pulse 31. If the time offset 32 is dimensioned to be smaller than the time interval between two adjacent data packets, a suitable, secure position of the start pulse is attained.

This corrective measure can be undertaken following switching on of the transmitters 6a, 6b, 6c and with effect from the presence of the vocoder voice data packets at the PCM bus. Vocoder packets are advantageously transmitted testwise according to the vocoder rhythm, so that the start pulses are optimally defined long before the transmitter 6a, 6b, 6c sends a voice burst for the first time. A voice burst transmission will then only take place if a corresponding voice burst header has been transmitted by the control unit RIU 5 to the relevant transmitter 6a, 6b, 6c. Provided that the air traffic controller does not speak and has not pressed any PTT (Push To Talk) button, the microphones are switched mute, due to which the constantly activated vocoder voice packets are forwarded with "mute information". The transmitter 6a, 6b, 6c can perform the "slip automatic action" described with reference to FIG. 6 with reference to the vocoder rhythm immediately after then transmitter 6a, 6b, 6c has been started up as a single corrective measure.

The time window and the time offset are geared to the quality of the vocoder-PCM supply and are advantageously generously dimensioned. If the "slip automatic action" described with reference to FIG. 6 is actually activated, the vocoders 2a, 2b, 2c, 2d and TDMA rhythm are in the best state (best case) timewise in relation to one another beforehand. After the "slip automatic action" has been switched in, the voice delay in the practical example shown in FIG. 4 is increased by 20 ms, i.e. by one packet length, and the worst case arises. However, there is no longer any danger that the speech is transmitted discontinuously.

The procedure stated here must be undertaken separately for each channel A, B, C and D, as the start pulses for these channels are generated at different times and the data packets for each channel are transmitted at different times, so that the relative position with regard to time of the transmission of the data packets with reference to the start pulse for each channel can be different.

The invention is not restricted to the practical example shown and in particular not to an application in VDL aeronautical radio. The delivery of the compressed data packets by the vocoders 2a, 2b, 2c, 2d can be synchronized by means of a synchronization pulse to increase the efficiency of the transmission further. In the practical example shown in FIG. 4, a synchronization pulse of this kind would be transmitted every 20 ms by the transmitter 6a, 6b, 6c to the relevant vocoder 2a, 2b, 2c, 2d. This would have the effect that the vocoders transmit their compressed data packets at defined times that are adapted optimally to the scrambling taking place in the transmitter 6a, 6b, 6c. Optimum adaptation is achieved if the fifth data packet in the practical example arrives shortly before the beginning of the scrambling procedure. A safety interval should be dimensioned in this case such that the "slip automatic action" described with reference to FIG. 6 does not respond just yet.

The invention claimed is:

1. Method for transmitting digital voice data packets between voice data inputs of a plurality of channels and at least one transmitter with the following method steps:
   compression of the voice data packets in a vocoder assigned to each channel of the plurality of channels to compressed data packets,
   feeding of the compressed data packets of each channel of the plurality of channels to a control unit,
   free-running, unsynchronized transmission of the compressed data packets on a data bus common to all channels from the control unit to a processor assigned to the transmitter and
   combining of a defined number of the compressed data packets of a certain channel last transmitted on the data bus to a transmission block by means of the processor, a last compressed data packet only being added to the transmission block at a time at which the transmission of the transmission block has already begun.

2. Method according to claim 1, characterized in that combining of the compressed data packets takes place at a start pulse produced at fixed time intervals, and that the time of the start pulse is displaced by a constant time offset from the time of an original start pulse if the time of receipt of a defined compressed data packet is within a set tolerance range around the time of the original start pulse.

3. Method according to claim 2, characterized in that the defined compressed data packet is the penultimate data packet that is assigned to the transmission block to which the start pulse refers.

4. Method according to one of claims 1 to 3, characterized in that the processor has a pre-processor connected to the data bus, a main processor, a shift register and a timing unit, that the timing unit transmits a start pulse to the main processor at constant time intervals, whereupon the main processor takes over the last n-1 compressed data packets received by the pre-processor via the data bus, combines them to form a transmission partial block consisting of n-1 compressed data packets and files it in the shift register, and that the preprocessor transmits a control command to the main processor when it has received a further, n-th compressed data packet via the data bus, whereupon the main processor combines the n-th data packet with the transmission partial block to a transmission block comprising n data packets and supplements the shift register accordingly.

5. Method according to claim 4, characterized in that for each channel the start pulses are generated at different times and that the main processor takes over from the pre-processor only the compressed data packets belonging to the channel activated by the start pulse.

6. Method according to claim 4, characterized in that the data stored in the shift register are transmitted via a further data bus to a digital signal processor of the transmitter connected to a modulator.

7. Method according to one of claims 1 to 3, characterized in that the vocoders are synchronized via a synchronization pulse and the compressed data packets are delivered by the vocoders at times defined by the synchronization pulse.

8. Method according to claim 5, characterized in that the data stored in the shift register are transmitted via a further data bus to a digital signal processor of the transmitter connected to a modulator.

* * * * *